United States Patent
Cai et al.

(10) Patent No.: US 9,683,129 B2
(45) Date of Patent: *Jun. 20, 2017

(54) POLYTHIOETHER SEALANTS WITH EXTENDED WORKING TIME

(71) Applicant: PRC-DeSoto International, Inc., Sylmar, CA (US)

(72) Inventors: Juexiao Cai, Stevenson Ranch, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/560,289

(22) Filed: Dec. 4, 2014

(65) Prior Publication Data

US 2016/0160080 A1 Jun. 9, 2016

(51) Int. Cl.
| | | |
|---|---|---|
| *C09D 181/02* | (2006.01) | |
| *B32B 27/00* | (2006.01) | |
| *C08G 75/02* | (2016.01) | |
| *C09K 3/10* | (2006.01) | |
| *B01J 13/00* | (2006.01) | |
| *C09D 181/00* | (2006.01) | |

(52) U.S. Cl.
CPC .......... *C09D 181/02* (2013.01); *B32B 27/00* (2013.01); *C08G 75/02* (2013.01); *C09K 3/1012* (2013.01)

(58) Field of Classification Search
CPC .................................................. C09D 181/02
USPC ................... 525/330.9; 523/400; 427/386
See application file for complete search history.

(56) References Cited

U.S. PATENT DOCUMENTS

| | | |
|---|---|---|
| 4,366,307 A | 12/1982 | Singh et al. |
| 4,609,762 A | 9/1986 | Morris et al. |
| 5,225,472 A | 7/1993 | Cameron et al. |
| 6,172,179 B1 | 1/2001 | Zook et al. |
| 6,525,168 B2 | 2/2003 | Zook et al. |
| 7,799,299 B2 | 9/2010 | Heldebrant et al. |
| 7,982,069 B2 | 7/2011 | Jessop et al. |
| 9,382,448 B2 * | 7/2016 | Cai ..................... C09D 181/02 |
| 2007/0173602 A1 | 7/2007 | Brinkman et al. |
| 2009/0076180 A1 | 3/2009 | Iwaya |
| 2010/0010133 A1 | 1/2010 | Zook et al. |
| 2010/0041839 A1 | 2/2010 | Anderson et al. |
| 2011/0319559 A1 | 12/2011 | Kania et al. |
| 2012/0040104 A1 | 2/2012 | Keledjian et al. |
| 2012/0116076 A1 | 5/2012 | Jessop et al. |
| 2013/0046092 A2 | 2/2013 | Jessop et al. |
| 2013/0137817 A1 | 5/2013 | Laborbe et al. |
| 2013/0165603 A1 | 6/2013 | Wi et al. |
| 2014/0110881 A1 | 4/2014 | Keledjian et al. |
| 2014/0272287 A1 | 9/2014 | Cai et al. |

FOREIGN PATENT DOCUMENTS

| | | |
|---|---|---|
| WO | WO 99/55454 | 11/1999 |
| WO | 2011/126702 A2 | 10/2011 |
| WO | WO 2013/192480 A2 | 12/2013 |

* cited by examiner

*Primary Examiner* — Duc Truong
(74) *Attorney, Agent, or Firm* — William R. Lambert

(57) ABSTRACT

Thiol-terminated polythioether compositions and sealants prepared using the thiol-terminated polythioether compositions that exhibit extended working time and that rapidly cures at room temperature at the end of the working time are disclosed.

16 Claims, 1 Drawing Sheet

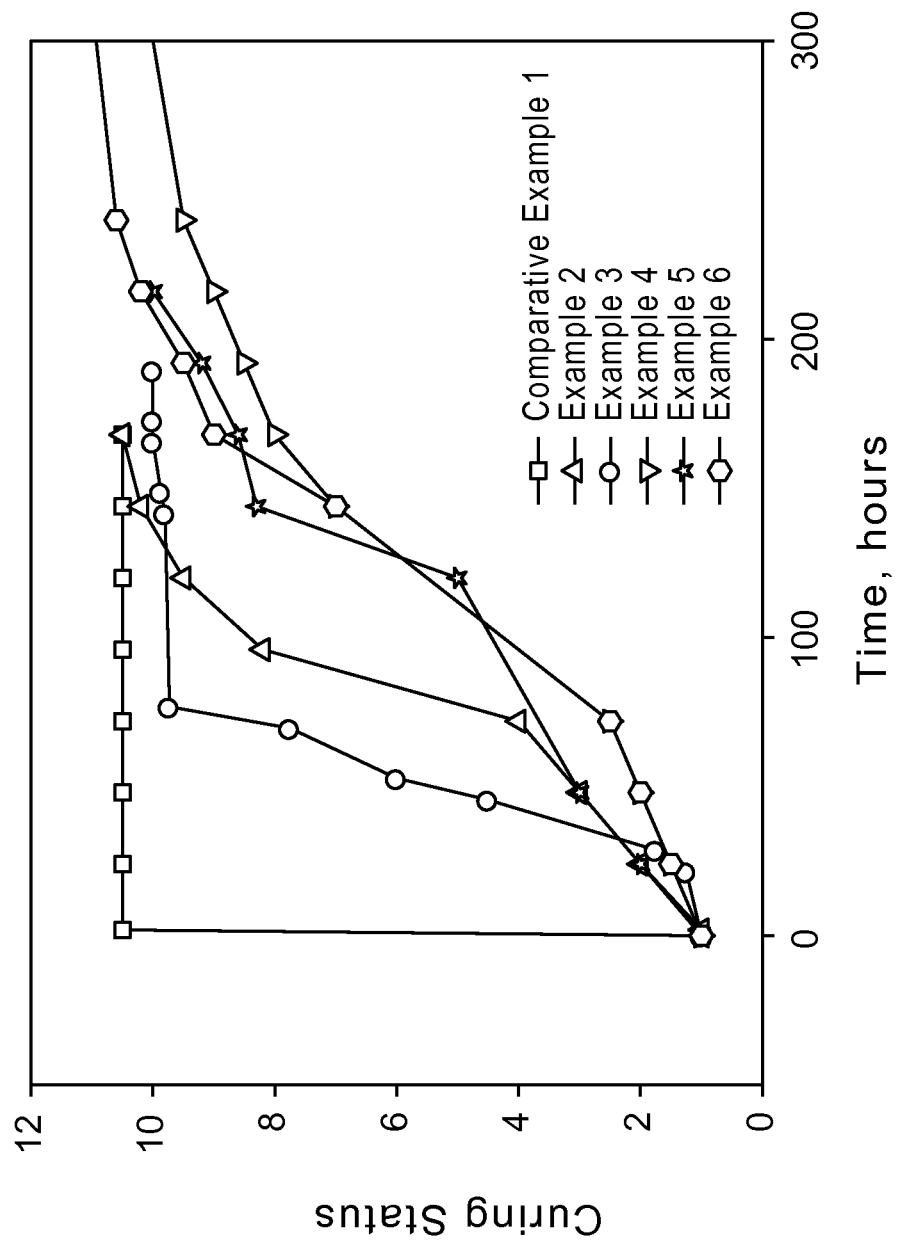

POLYTHIOETHER SEALANTS WITH EXTENDED WORKING TIME

FIELD

The present disclosure relates to thiol-terminated polythioether compositions and sealants prepared from the thiol-terminated polythioether compositions having extended working time and fast cure rates.

BACKGROUND

Thiol-terminated polythioethers are well-known to be useful in aerospace sealant applications. Aerospace sealants must meet a number of challenging performance requirements that including adhesion, tensile strength, elongation, fuel resistance, and high temperature stability. Typical polythioether-based sealants are characterized by a relatively short working time of less than 12 hours.

Thiol-terminated polythioether-based sealant formulations exhibiting extended working time and that cure rapidly at the end of the working time are desired.

SUMMARY

Epoxy-cured, thiol-terminated polythioether-based sealants that include a latent amine catalyst exhibit extended working time and meet the demanding performance requirements of aerospace sealant applications.

In a first aspect, compositions are provided, comprising a thiol-terminated polythioether prepolymer, an epoxy curing agent, and a latent amine catalyst.

In a second aspect, a cured sealant prepared from a composition provided by the present disclosure are provided.

In a third aspect, methods of sealing one or more surfaces are provided, comprising applying a composition provided by the present disclosure to one or more surfaces, and curing the composition to seal the one or more surfaces.

BRIEF DESCRIPTION OF THE DRAWINGS

FIG. 1 is a graph showing the curing status with time of sealants provided by the present disclosure.

Reference is now made to certain embodiments of compositions and methods. The disclosed embodiments are not intended to be limiting of the claims. To the contrary, the claims are intended to cover all alternatives, modifications, and equivalents.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —$CONH_2$ is attached through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. In certain embodiments, the alkyl group is $C_{1-6}$ alkyl, $C_{1-4}$ alkyl, and in certain embodiments, $C_{1-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{1-6}$ alkyl, $C_{1-4}$ alkyl, and in certain embodiments, $C_{1-3}$ alkyl. It will be appreciated that a branched alkyl has at least three carbon atoms.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

As used herein, "polymer" refers to oligomers, homopolymers, and copolymers, which may be cured or uncured. Unless stated otherwise, molecular weights are number average molecular weights for polymeric materials indicated as "$M_n$" as determined, for example, by gel permeation chromatography using a polystyrene standard in an art-recognized manner. Unless stated otherwise, molecular weights are number average molecular weights for polymeric materials indicated as "Mn" as may be determined, for example, by gel permeation chromatography using a polystyrene standard in an art-recognized manner.

"Prepolymers" refer to polymers prior to curing. In general, prepolymers provided by the present disclosure are liquid at room temperature. "Adducts" refer to prepolymers that are functionalized with a reactive terminal group; however, prepolymers may also contain terminal functional groups. Thus, the terms prepolymer and adduct are used interchangeably. The term adduct is often used to refer to a prepolymer that is an intermediate in a reaction sequence used to prepare a prepolymer.

Reference is now made in detail to certain embodiments of compounds, compositions, and methods. The disclosed embodiments are not intended to be limiting of the claims. To the contrary, the claims are intended to cover all alternatives, modifications, and equivalents.

Compositions provided by the present disclosure include a thiol-terminated polythioether prepolymer, an epoxy curing agent, and a latent tertiary amine catalyst. In certain embodiments, a composition is formulated as a sealant, such as an aerospace sealant.

Compositions and sealant formulations provided by the present disclosure include a thiol-terminated polythioether prepolymer.

Examples of suitable thiol-terminated polythioether prepolymers are disclosed, for example, in U.S. Pat. No. 6,172,179, which is incorporated by reference in its entirety.

In certain embodiments, a thiol-terminated polythioether prepolymer comprises a thiol-terminated polythioether prepolymer comprising a backbone comprising the structure of Formula (1):

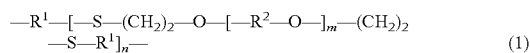
(1)

wherein,
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a —[(—CHR$^3$—)$_p$—X—]$_q$—(CHR$^3$)$_r$— group, wherein each $R^3$ is selected from hydrogen and methyl;

each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a —[(—CH$_2$—)$_p$—X—]$_q$—(CH$_2$)$_r$— group;

each X is independently selected from O, S, and —NR—, wherein R is selected from hydrogen and methyl;

m ranges from 0 to 50;
n is an integer ranging from 1 to 60;
p is an integer ranging from 2 to 6;
q is an integer ranging from 1 to 5; and
r is an integer ranging from 2 to 10.

In certain embodiments of a prepolymer of Formula (1), $R^1$ is —[—(CHR$^3$)$_p$—X—]$_q$—(CHR$^3$)$_r$— wherein each X is independently selected from —O— and —S—. In certain embodiments wherein $R^1$ is —[—(CHR$^3$)$_p$—X—]$_q$—(CHR$^3$)$_r$—, each X is —O— and in certain embodiments, each X is —S—.

In certain embodiments of a prepolymer of Formula (1), $R^1$ is —[—(CH$_2$)$_p$—X—]$_q$—(CH$_2$)$_r$— wherein each X is independently selected from —O— and —S—. In certain embodiments wherein $R^1$ is —[—(CH$_2$)$_p$—X—]$_q$—(CH$_2$)$_r$—, each X is —O— and in certain embodiments, each X is —S—.

In certain embodiments or a prepolymer of Formula (1), $R^1$ is —[(—CH$_2$—)$_p$—X—]$_q$—(CH$_2$)$_r$—, where p is 2, X is O, q is 2, r is 2, $R^2$ is ethanediyl, m is 2, and n is 9.

In certain embodiments of a prepolymer of Formula (1), each $R^1$ is derived from dimercaptodioxaoctane (DMDO) and in certain embodiments, each $R^1$ is derived from dimercaptodiethylsulfide (DMDS).

In certain embodiments of Formula (1), each m is independently an integer from 1 to 3. In certain embodiments, each m is the same and is 1, 2, and in certain embodiments, 3.

In certain embodiments of Formula (1), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (1), each p is independently selected from 2, 3, 4, 5, and 6. In certain embodiments, each p is the same and is 2, 3, 4, 5, or 6.

Examples of suitable thiol-terminated polythioether prepolymers are disclosed, for example, in U.S. Pat. No. 6,172,179. In certain embodiments, a thiol-terminated polythioether prepolymer comprises Permapol® P3.1E, available from PRC-DeSoto International Inc., Sylmar, Calif.

In certain embodiments, a thiol-terminated polythioether prepolymer comprises a thiol-terminated polythioether prepolymer selected from a thiol-terminated polythioether of Formula (2a), a thiol-terminated polythioether prepolymer of Formula (2b), and a combination thereof:

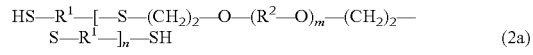
(2a)

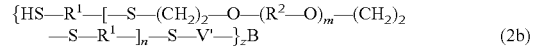
(2b)

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(—CHR$^3$—)$_p$—X—]$_q$—(—CHR$^3$—)$_r$—, wherein,
p is an integer from 2 to 6;

q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(—$CHR^3$—)$_p$—X—]$_q$—(—$CHR^3$—)$_r$—, wherein p, q, r, $R^3$, and X
are as defined as for $R^1$;
m is an integer from 0 to 50;
n is an integer from 1 to 60;
B represents a core of a z-valent, polyfunctionalizing agent B(—V)$_z$ wherein,
z is an integer from 3 to 6; and
each V is a moiety comprising a terminal group reactive with a thiol; and
each —V'— is derived from the reaction of —V with a thiol.

In certain embodiments of Formula (2a) and in Formula (2b), $R^1$ is —[(—$CH_2$—)$_p$—X—]$_q$—($CH_2$)$_r$, where p is 2, X is —O—, q is 2, r is 2, $R^2$ is ethanediyl, m is 2, and n is 9.

In certain embodiments of Formula (2a) and Formula (2b), $R^1$ is selected from $C_{2-6}$ alkanediyl and —[—($CHR^3$)$_p$—X—]$_q$—($CHR^3$)$_r$.

In certain embodiments of Formula (2a) and Formula (2b), $R^1$ is —[—($CHR^3$)$_p$—X—]$_q$—($CHR^3$)$_r$, and in certain embodiments X is —O— and in certain embodiments, X is —S—.

In certain embodiments of Formula (2a) and Formula (2b), where $R^1$ is —[—($CHR^3$)$_p$—X—]$_q$—($CHR^3$)$_r$, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of Formula (2a) and Formula (2b), where $R^1$ is —[—($CHR^3$)$_p$—X—]$_q$—($CHR^3$)$_r$, each $R^3$ is hydrogen, and in certain embodiments, at least one $R^3$ is methyl.

In certain embodiments of Formula (2a) and Formula (2b), each $R^1$ is the same, and in certain embodiments, at least one $R^1$ is different.

Various methods can be used to prepare thiol-terminated polythioethers of Formula (2a) and Formula (2b). Examples of suitable thiol-terminated polythioethers, and methods for their production, are described in U.S. Pat. No. 6,172,179. Such thiol-terminated polythioethers may be difunctional, that is, linear polymers having two terminal thiol groups, or polyfunctional, that is, branched polymers have three or more terminal thiol groups. Suitable thiol-terminated polythioethers are commercially available, for example, as Permapol® P3.1E, from PRC-DeSoto International Inc., Sylmar, Calif.

In certain embodiments, a thiol-terminated polythioether prepolymer may comprise a mixture of different thiol-terminated polythioethers and the thiol-terminated polythioethers may have the same or different functionality. In certain embodiments, a thiol-terminated polythioether prepolymer has an average functionality from 2 to 6, from 2 to 4, from 2 to 3, from 2.05 to 2.8, and in certain embodiments, from 2.05 to 2.5. For example, a thiol-terminated polythioether prepolymer can be selected from a difunctional thiol-terminated polythioether, a trifunctional thiol-terminated polythioether and a combination thereof.

In certain embodiments, a thiol-terminated polythioether prepolymer can be prepared by reacting a polythiol and a diene such as a divinyl ether, and the respective amounts of the reactants used to prepare the polythioethers are chosen to yield terminal thiol groups. Thus, in some cases, (n or >n, such as n+1) moles of a polythiol, such as a dithiol or a mixture of at least two different dithiols and about 0.05 moles to 1 moles, such as 0.1 moles to 0.8 moles, of a thiol-terminated polyfunctionalizing agent may be reacted with (n) moles of a diene, such as a divinyl ether, or a mixture of at least two different dienes, such as a divinyl ether. In certain embodiments, a thiol-terminated polyfunctionalizing agent is present in the reaction mixture in an amount sufficient to provide a thiol-terminated polythioether having an average functionality of from 2.05 to 3, such as from 2.1 to 2.8, or from 2.1 to 2.6.

The reaction used to make a thiol-terminated polythioether prepolymer may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioether prepolymers may be produced by reacting a divinyl ether or mixtures of divinyl ethers with an excess of dithiol or a mixtures of dithiols.

Thus, in certain embodiments, a thiol-terminated polythioether prepolymer comprises the reaction product of reactants comprising:
(a) a dithiol of Formula (3):

$$HS—R^1—SH \qquad (3)$$

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—($CHR^3$)$_p$—X—]$_q$—($CHR^3$)$_r$—; wherein,
each $R^3$ is independently selected from hydrogen and methyl;
each X is independently selected from —O—, —S—, —NH—, and —NR—
wherein R is selected from hydrogen and methyl;
p is an integer from 2 to 6;
q is an integer from 1 to 5; and
r is an integer from 2 to 10; and
(b) a divinyl ether of Formula (4):

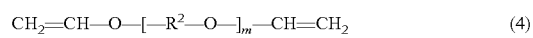

$$CH_2=CH—O—[—R^2—O—]_m—CH=CH_2 \qquad (4)$$

wherein,
each $R^2$ is independently selected from $C_{1-10}$ alkanediyl, $C_{6-8}$ cycloalkanediyl, $C_{6-14}$ alkanecycloalkanediyl, and —[(—$CHR^3$—)$_p$—X—]$_q$—(—$CHR^3$—)$_r$—, wherein p, q, r, $R^3$, and X are as defined above; and
m is an integer from 0 to 50.
And, in certain embodiments, the reactants may comprise (c) a polyfunctional compound such as a polyfunctional compound B(—V)$_z$, where B, —V, and z are as defined herein.

In certain embodiments, dithiols suitable for use in preparing thiol-terminated polythioether prepolymers include those having the structure of Formula (3):

$$HS—R^1—SH \qquad (3)$$

wherein,

R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_p$—X—]$_q$—(CHR$^3$)$_r$—; wherein, each R$^3$ is independently selected from hydrogen and methyl;

each X is independently selected from —O—, —S—, and —NR— wherein R is selected from hydrogen and methyl;

p is an integer from 2 to 6;

q is an integer from 1 to 5; and r is an integer from 2 to 10.

In certain embodiments of a dithiol of Formula (3), R$^1$ is —[—(CHR$^3$)$_p$—X—]$_q$—(CHR$^3$)$_r$—.

In certain embodiments of a compound of Formula (3), X is selected from —O— and —S—, and thus —[—(CHR$^3$)$_p$—X—]$_q$—(CHR$^3$)$_r$— in Formula (3) is —[(—CHR$^3$—)$_p$—O—]$_q$—(CHR$^3$)$_r$— or —[(—CHR$^3$$_2$—)$_p$—S—]$_q$—(CHR$^3$)$_r$. In certain embodiments, p and r are equal, such as where p and r are both two.

In certain embodiments of a dithiol of Formula (3), R$^1$ is selected from C$_{2-6}$ alkanediyl and —[—(CHR$^3$)$_p$—X—]$_q$—(CHR$^3$)$_r$—.

In certain embodiments of a dithiol of Formula (3), R$^1$ is —[—(CHR$^3$)$_p$—X—]$_q$—(CHR$^3$)$_r$—, and in certain embodiments X is —O—, and in certain embodiments, X is —S—.

In certain embodiments of a dithiol of Formula (3) where R$^1$ is —[—(CHR$^3$)$_p$—X—]$_q$—(CHR$^3$)$_r$, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of a dithiol of Formula (3) where R$^1$ is —[—(CHR$^3$)$_p$—X—]$_q$—(CHR$^3$)$_r$, each R$^3$ is hydrogen, and in certain embodiments, at least one R$^3$ is methyl.

In certain embodiments of a dithiol of Formula (3), each R$^1$ is derived from dimercaptodioxaoctane (DMDO) and in certain embodiments, each R$^1$ is derived from dimercaptodiethylsulfide (DMDS).

In certain embodiments of Formula (3), each m is independently an integer from 1 to 3. In certain embodiments, each m is the same and is 1, 2, and in certain embodiments, 3.

In certain embodiments of Formula (3), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (3), each p is independently selected from 2, 3, 4, 5, and 6. In certain embodiments, each p is the same and is 2, 3, 4, 5, or 6.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

In certain embodiments, a dithiol may have one or more pendant groups selected from a lower (e.g., C$_{1-6}$) alkyl group, a lower alkoxy group, and a hydroxy group. Suitable alkyl pendant groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in Formula (3), R$^1$ is —[(—CH$_2$—)$_p$—X—]$_q$—(CH$_2$)$_r$—, wherein p is 2, r is 2, q is 1, and X is —S—); dimercaptodioxaoctane (DMDO) (in Formula (3), R$^1$ is —[(—CH$_2$—)$_p$—X—]$_q$—(CH$_2$)$_r$—, wherein p is 2, q is 2, r is 2, and X is —O—); and 1,5-dimercapto-3-oxapentane (in Formula (3), R$^1$ is —[(—CH$_2$—)$_p$—X—]$_q$—(CH$_2$)$_r$—, wherein p is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for preparing thiol-terminated polythioethers include, for example, divinyl ethers of Formula (4):

$$CH_2=CH-O-(-R^2-O-)_m-CH=CH_2 \qquad (4)$$

where R$^2$ in Formula (4) is selected from a C$_{2-6}$ n-alkanediyl group, a C$_{3-6}$ branched alkanediyl group, a C$_{6-8}$ cycloalkanediyl group, a C$_{6-10}$ alkanecycloalkanediyl group, and —[(—CH$_2$—)$_p$—O—]$_q$—(—CH$_2$—)$_r$—, where p is an integer ranging from 2 to 6, q is an integer from 1 to 5, and r is an integer from 2 to 10. In certain embodiments of a divinyl ether of Formula (4), R$^2$ is a C$_{2-6}$ n-alkanediyl group, a C$_{3-6}$ branched alkanediyl group, a C$_{6-8}$ cycloalkanediyl group, a C$_{6-10}$ alkanecycloalkanediyl group, and in certain embodiments, —[(—CH$_2$—)$_p$—O—]$_q$—(—CH$_2$—)$_r$—.

Suitable divinyl ethers include, for example, compounds having at least one oxyalkanediyl group, such as from 1 to 4 oxyalkanediyl groups, i.e., compounds in which m in Formula (4) is an integer ranging from 1 to 4. In certain embodiments, m in Formula (4) is an integer ranging from 2 to 4. It is also possible to employ commercially available divinyl ether mixtures that are characterized by a non-integral average value for the number of oxyalkanediyl units per molecule. Thus, m in Formula (4) can also take on rational number values ranging from 0 to 10.0, such as from 1.0 to 10.0, from 1.0 to 4.0, or from 2.0 to 4.0.

Examples of suitable vinyl ethers include, divinyl ether, ethylene glycol divinyl ether (EG-DVE) (R$^2$ in Formula (4) is ethanediyl and m is 1), butanediol divinyl ether (BD-DVE) (R$^2$ in Formula (4) is butanediyl and m is 1), hexanediol divinyl ether (HD-DVE) (R$^2$ in Formula (4) is hexanediyl and m is 1), diethylene glycol divinyl ether (DEG-DVE) (R$^2$ in Formula (4) is ethanediyl and m is 2), triethylene glycol divinyl ether (R$^2$ in Formula (4) is ethanediyl and m is 3), tetraethylene glycol divinyl ether (R$^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxy groups, alkoxy groups, and amine groups.

In certain embodiments, divinyl ethers in which R$^2$ in Formula (4) is C$_{3-6}$ branched alkanediyl may be prepared by reacting a polyhydroxy compound with acetylene. Examples of divinyl ethers of this type include compounds in which R$^2$ in Formula (4) is an alkyl-substituted methanediyl group such as —CH(—CH$_3$)—, for which R$^2$ in Formula (4) is ethanediyl and m is 3 or an alkyl-substituted ethanediyl.

Other useful divinyl ethers include compounds in which $R^2$ in Formula (4) is polytetrahydrofuryl (poly-THF) or polyoxyalkanediyl, such as those having an average of about 3 monomer units.

Two or more types of polyvinyl ether monomers of Formula (4) may be used. Thus, in certain embodiments, two dithiols of Formula (3) and one polyvinyl ether monomer of Formula (4), one dithiol of Formula (3) and two polyvinyl ether monomers of Formula (4), two dithiols of Formula (3) and two divinyl ether monomers of Formula (4), and more than two compounds of one or both Formula (3) and Formula (4), may be used to produce a variety of thiol-terminated polythioethers.

In certain embodiments, a polyvinyl ether monomer comprises 20 to less than 50 mole percent of the reactants used to prepare a thiol-terminated polythioether, and in certain embodiments, 30 to less than 50 mole percent.

In certain embodiments provided by the present disclosure, relative amounts of dithiols and divinyl ethers are selected to yield polythioethers having terminal thiol groups. Thus, a dithiol of Formula (3) or a mixture of at least two different dithiols of Formula (3), can be reacted with of a divinyl ether of Formula (4) or a mixture of at least two different divinyl ethers of Formula (4) in relative amounts such that the molar ratio of thiol groups to alkenyl groups is greater than 1:1, such as from 1.1 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-terminated polythioether prepolymers provided by the present disclosure may be prepared by combining at least one dithiol of Formula (3) and at least one divinyl ether of Formula (4) followed by addition of an appropriate catalyst, and carrying out the reaction at a temperature from 30° C. to 120° C., such as 70° C. to 90° C., for a time from 2 hours to 24 hours, such as 2 hours to 6 hours.

As disclosed herein, thiol-terminated polythioether prepolymers may comprise a polyfunctional polythioether prepolymer, i.e., may have an average functionality of greater than 2.0. Suitable polyfunctional thiol-terminated polythioethers include, for example, those having the structure of Formula (2b):

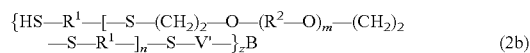

(2b)

wherein z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-terminated polymers include tri-functionalizing agents, that is, compounds where z is 3.

Suitable trifunctionalizing agents include, for example, tri-allyl cyanurate (TAC), 1,2,3-propanetrithiol, isocyanurate-containing trithiols, and combinations thereof, as disclosed in U.S. Application Publication No. 2010/0010133, which is incorporated by reference in its entirety, and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioethers provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

In certain embodiments, compositions provided by the present disclosure comprise a polyepoxy curing agent. A polyepoxy refers to a compound having two or more reactive epoxy groups. In certain embodiments, a polyepoxy resin is difunctional and in certain embodiments, includes a combination of polyepoxides having different epoxy functionalities. In certain embodiments, a polyepoxy may include a combination of polyepoxy resins. In certain embodiments, a polyepoxy resin is liquid at room temperature.

Examples of suitable polyepoxy curing agents include, for example, polyepoxide resins such as hydantoin diepoxide, diglycidyl ether of bisphenol-A, diglycidyl ether of bisphenol-F, Novolac® type epoxides such as DEN™ 438 and DEN™ 431, certain epoxidized unsaturated resins, and combinations of any of the foregoing.

In certain embodiments, a polyepoxy comprises a polyepoxy selected from a Novolac® epoxy resin such as DEN® 431, a bisphenol A/epichlorohydrin derived epoxy resin such as EPON® 828, or a combination thereof. In certain embodiments, the a polyepoxy curing agent is a combination of a Novolac® epoxy resin and a bisphenol A/epichlorohydrin derived epoxy resin. In such embodiments, the weight ratio of Novolac® epoxy resin to bisphenol A/epichlorohydrin derived epoxy resin is from about 0.25:1 to about 4:1, from about 0.5:1 to about 2:1, from about 0.75:1 to about 1.5:1 and in certain embodiments, about 1:1.

In certain embodiments, a composition provided by the present disclosure includes from 1 wt % to 13 wt % of the total weight of the composition, from 2 wt % to 12 wt %, from 3 wt % to 11 wt %, from 4 wt % to 10 wt %, from 5 wt % to 9 wt %, from 6 wt % to 8 wt %, and in certain embodiments, about 7 wt %.

Other examples of suitable polyepoxy resins include a bisphenol A type epoxy resin, a brominated bisphenol A type epoxy resin, a bisphenol F type epoxy resin, a biphenyl type epoxy resin, a Novolac type epoxy resin, an alicyclic epoxy resin, a naphthalene type epoxy resin, an ether series or polyether series epoxy resin, an oxirane ring-containing polybutadiene, and a silicone epoxy copolymer.

Additional examples of suitable polyepoxy resins include a bisphenol A type epoxy resin having an average molecular weight of about 400 or less; a branched polyfunctional bisphenol A type epoxy resin such as p-glycidyloxyphenyl dimethyltolylbisphenol A diglycidyl ether; a bisphenol F type epoxy resin; a phenol novolac type epoxy resin having an average molecular weight of about 570 or less; an alicyclic epoxy resin such as vinyl(3,4-cyclohexene)dioxide, methyl 3,4-epoxycyclohexylcarboxylate (3,4-epoxycyclohexyl), bis(3,4-epoxy-6-methylcyclohexylmethyl) adipate and 2-(3,4-epoxycyclohexyl)-5,1-spiro(3,4-epoxycyclohexyl)-m-dioxane; a biphenyl type epoxy resin such as 3,3',5,5'-tetramethyl-4,4'-diglycidyloxybiphenyl; a glycidyl ester type epoxy resin such as diglycidyl hexahydrophthalate, diglycidyl 3-methylhexahydro phthalate and diglycidyl hexahydroterephthalate: a glycidylamine type epoxy resin such as diglycidylaniline, diglycidyltoluidine, triglycidyl-p-aminophenol, tetraglycidyl-m-xylene diamine, tetraglycidylbis(aminomethyl)cyclohexane; a hydantoin type epoxy resin such as 1,3-diglycidyl-5-methyl-5-ethylhydantoin; and a naphthalene ring-containing epoxy resin may be mentioned. Also, an epoxy resin having silicone such as 1,3-bis (3-glycidoxy-propyl)-1,1,3,3-tetramethyldisiloxane may be used. Moreover, a diepoxide compound such as (poly) ethylene glycol diglycidyl ether, (poly)propylene glycol diglycidyl ether, butanediol diglycidyl ether and neopentyl glycol diglycidyl ether; and a triepoxide compound such as trimethylolpropane triglycidyl ether and glycerin triglycidyl ether.

Examples of commercially available epoxy resins suitable for use in compositions provided by the present disclosure include polyglycidyl derivatives of phenolic compounds, such as those available under the trade names EPON 828, EPON 1001, EPON 1009, and EPON 1031, from Resolution Performance Products LLC; and DER 331, DER 332, DER 334, and DER 542 from Dow Chemical Co. Other suitable epoxy resins include polyepoxides prepared from polyols and the like and polyglycidyl derivatives of phenol-formaldehyde Novolacs, the latter of which are commercially available under the trade names DEN 431, DEN 438, and DEN 439 from Dow Chemical Company. Cresol analogs are also available commercially ECN 1235, ECN 1273, and ECN 1299 from Ciba Specialty Chemicals, Inc. SU-8 is a bisphenol A-type epoxy Novolac available from Resolution Performance Products LLC. Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE MY-721, ARALDITE 0500, and ARALDITE 0510 from Ciba Specialty Chemicals, Inc. and PGA-X and PGA-C from the Sherwin-Williams Co.

Compositions provided by the present disclosure include one or more latent amine catalyst.

A latent amine catalyst refers to an amine catalyst that is slowly released or diffuses from a barrier at room temperature. The release or diffusion of the amine catalyst may be accelerated at increased temperature, however, at room temperature the time for release provides for an extended working time or pot life of the composition. Thus, a composition containing a latent amine catalyst provides for a long shelf life and when mixed with reactants such as a thiol-terminated polythioether and a polyepoxy, provide for an extended working time and a fast curing time. A latent amine catalyst does not necessarily require activation such as by exposure to elevated temperature to release the catalyst.

A suitable amine catalyst for use in compositions of the present disclosure is capable of catalyzing the reaction between thiol and epoxy groups. In certain embodiments, an amine catalyst is a tertiary amine catalyst such as, for example, N,N-dimethylethanolamine, triethylene diamine (TEDA), bis(2-dimethylaminoethyl)ether (BDMAE), N-ethylmorpholine, N',N'-dimethylpiperazine, N,N,N',N', N'-pentamethyl-diethylene-triamine (PMDETA), N,N-dimethylcyclohexylamine (DMCHA), N,N-dimethylbenzylamine (DMBA), N,N-dimethylcethylamine, N,N,N',N''-pentamethyl-dipropylene-triamine (PMDPTA), triethylamine, 1-(2-hydroxypropyl)imidazole, 1,4-diazabicyclo[2.2.2]octane (DABCO®, commercially available from Air Products, Chemical Additives Division, Allentown, Pa.) and DMP-30® (an accelerant composition including 2,4,6-tris(dimethylaminomethyl)phenol, dimethylethanolamine (DMEA), bis-(2-dimethylaminoethyl)ether, N-ethylmorpholine, triethylamine, 1,8-diazabicyclo[5.4.0] undecene-7 (DBU), benzyldimethylamine (BDMA), N,N, N'-trimethyl-N'-hydroxyethyl-bis(aminoethyl)ether, and N'-(3-(dimethylamino)propyl)-N,N-dimethyl-1,3-propanediamine.

In certain embodiments, a tertiary amine catalyst is an imidazole catalyst.

Examples of suitable imidazole catalysts include imidazole, 2-methylimidazole, 2-ethylimidazole, 2-isopropylimidazole, 2-undecylimidazole, 2-dodecylimidazole, 2-phenylimidazole, 2-ethyl-4-methyl-imidazole, 2-benzylimidazole, 2,4,5-trimethylimidazole and a combination of any of the foregoing.

Other examples of suitable imidazoles include substituted imidazoles such as alkyl-substituted imidazoles include 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-n-heptadecylimidazole, 2-undecylimidazole, 2-heptadecylimidazole, 1-benzyl-2-methylimidazole, 1-propyl-2-methylimidazole, 1-cyanoethyl-2-methylimidazole, 1-cyanoethyl-1-cyanoethyl-2-undecylimidazole, 1-cyanoethyl-2-phenylimidazole, 1-guanaminoethyl-2-methylimidazole and addition products of an imidazole and trimellitic acid, 2-n-heptadecyl-4-methylimidazole; and aryl-substituted imidazoles including phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, and 2-p-methoxystyrylimidazole.

In certain embodiments, an imidazole catalyst is an imidazole-epoxy adduct. An imidazole-epoxy adduct can be obtained by reacting an imidazole compound with an epoxy compound. An imidazole compound can be, for example, any of those disclosed herein. Examples, of suitable epoxy compounds for forming an imidazole-epoxy adduct include 1,2-epoxybutane, 1,2-epoxyhexane, 1,2-epoxyoctane, styreneoxide, n-butyl glycidyl ether, hexyl glycidyl ether, phenyl glycidyl ether, glycidyl acetate, glycidyl butyrate, glycidyl hexoate, and glycidyl benzoate. Examples of suitable imidazole-epoxy adducts formed by the addition of an imidazole compound to an epoxy compound include, for example, NOVACURE HX-3722 (an encapsulated imidazole/bisphenol A epoxy adduct dispersed in bisphenol A epoxy) and NOVACURE HX-3921 HP, commercially available from Asahi-Ciba, Ltd., may also be used.

In certain embodiments, a latent amine catalyst comprises a shell surrounding core containing a tertiary amine catalyst.

Examples of suitable latent amine catalysts include Technicure® LC-80 and Technicure® 101 (available from A&C Catalyst), and EID-8519-01, an encapsulated DBU catalyst available from Salvona Technologies, LLC.

In certain embodiments, a latent amine catalyst is an inclusion catalyst in which an amine catalyst is incorporated within an inclusion complex. Examples of suitable inclusion catalysts include those provided by Nippon Soda Co., Ltd. In an inclusion complex a curing agent is complexed with a host molecule by means of crystallization. In an inclusion catalyst a guest molecule such as an imidazole is quenched between host molecules to form an inclusion complex. Upon exposure to heat such as room temperature, the inclusion complex dissociates to release the guest molecule. In certain embodiments, an inclusion complex contains an imidazole amine catalyst such as 2-methylimidazole, 2-ethyl-4-1H-methylimidazole, (4-methyl-2-phenyl-1H-imidazol-5-yl) methanol, and 1-(2-cyanoethyl)-2-ethyl-4-methylimidazole. An example of an imidazole inclusion catalyst is Nissocure™ TIC-188 available from Nisso America, Inc.

Compositions provided by the present disclosure may comprise one or more additional components suitable for use in aerospace sealants and the selection depends at least in part on the desired performance characteristics of the cured sealant under conditions of use.

In certain embodiments, compositions provided by the present disclosure comprise an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group, —Si(—R)$_m$(—OR)$_{3-m}$, where each R is independently selected from hydrogen, alkyl, cycloalkyl, aryl, and others, and m is selected from 0, 1, and 2. Examples of ethylenically unsaturated silanes are disclosed in U.S. Publication No. 2012/0040104, which is incorporated by reference in its entirety.

In certain embodiments, compositions provided by the present disclosure comprise one or more than one adhesion promoter. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art. In certain embodiments, the adhesion promoter includes T-1601, available from PRC-DeSoto International.

Compositions provided by the present disclosure may comprise one or more different types of filler. Suitable fillers include inorganic fillers, such as carbon black and calcium carbonate (CaCO$_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 microns to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839, which is incorporated by reference in its entirety.

In certain embodiments, a low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, from 0.7 to 0.9, from 0.75 to 0.85, and in certain embodiments, is about 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

A composition may also include any number of additives as desired. Examples of suitable additives include plasticizers, pigments, surfactants, adhesion promoters, thixotropic agents, fire retardants, masking agents, and accelerators (such as amines, including 1,4-diazabicyclo[2.2.2]octane, DABCO®), and combinations of any of the foregoing. When used, the additives may be present in a composition in an amount ranging, for example, from about 0 wt % to 60 wt %. In certain embodiments, additives may be present in a composition in an amount ranging from about 25 wt % to 60 wt %.

In certain embodiments, compositions provided by the present disclosure may include an additional thiol-terminated sulfur-containing prepolymer such as, for example, a thiol-terminated polysulfide or a thiol-terminated sulfur-containing polyformal.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A sealant can be used to seal surfaces, smooth surfaces, fill gaps, seal joints, seal apertures, and other features. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions containing thiol-terminated polythioether prepolymers, epoxy curing agents, and latent amine catalysts are formulated as sealants.

In certain embodiments, compositions, such as sealants, may be provided as multi-pack compositions, such as two-pack compositions, wherein one package comprises one or more thiol-terminated polythioether prepolymers and one or more latent amine catalysts and a second package comprises one or more epoxy curing agents. Additives and/or other materials may be added to either package as desired or necessary. The two packages may be combined and mixed prior to use. In certain embodiments, the pot life of the one or more mixed thiol-terminated polythioethers and epoxies is at least 48 hours, at least 72 hours, at least 96 hours, and in certain embodiments, at least 120 hours, where pot life refers to the period of time the mixed composition remains workable following mixing. As used herein, pot life also refers to the working time of a composition. In certain embodiments, as illustrated in Table 3, the useful working time is defined as the point during curing at which there is slight gelling but the sealant is still movable and spreadable. In certain embodiments, the pot life is from about 25 hours to about 100 hours, from about 30 hours to about 90 hours, from about 40 hours to about 80 hours. In certain embodiments, a composition provided by the present disclosure cures to a tack free surface at room temperature from 50 hours to 200 hours, from 75 hours to 175 hours, and in certain embodiments from about 100 hours to about 200 hours. In certain embodiments, a composition provided by the present disclosure cures to a Shore A hardness of 20 A at room temperature within from 50 hours to 200 hours, from 75 hours to 175 hours, and in certain embodiments from about 100 hours to about 200 hours.

In certain embodiments, a sealant composition contains from about 30% to about 70 wt % of a thiol-terminated polythioether prepolymer, from about 35 wt % to about 65 wt %, from about 40 wt % to about 60 wt % and in certain embodiments from about 45 wt % to about 55 wt % of a thiol-terminated polythioether prepolymer. In certain embodiments, a sealant composition contains from about 2 wt % to about 12 wt % of an epoxy curing agent, from about 3 wt % to about 11 wt %, from about 4 wt % to about 10 wt %, and in certain embodiments, from about 5 wt % to about 9 wt % of an epoxy curing agent. In certain embodiments, a sealant composition contains from about 0.2 wt % to about 6 wt % of a latent amine catalyst, from about 0.3 wt % to about 5 wt %, from 0.4 wt % to about 4 wt %, and in certain embodiments, from about 0.5 wt % to about 3 wt % of a latent amine catalyst. In each of these compositions, wt % refers to the weight with respect to the total weight of the composition.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises applying a sealant composition provided by the present disclosure to surfaces defining an aperture and curing the sealant, to provide a sealed aperture.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C.

In certain embodiments, when cured at room temperature sealant provided by the present disclosure cures to a tack free surface within about 50 hours to about 200 hours after the sealant components are mixed, within about 50 hours to about 150 hours, within about 50 hours to about 150 hours, and in certain embodiments, within about 100 hours to about 200 hours.

In certain embodiments, when cured at room temperature a sealant provided by the present disclosure cures to a hardness of at least Shore A 20 within about 50 hours to about 250 hours after the sealant components are mixed, within about 50 hours to about 200 hours, within about 50 hours to about 150 hours, and in certain embodiments within about 100 hours to about 200 hours.

In certain embodiments, compositions provided by the present disclosure cure rapidly at the end of the working time. For example, in certain embodiments, a sealant cures, at room temperature, to a tack free surface within 24 hours after the time the sealant is no longer workable (end of working time), within 36 hours, and in certain embodiments, within 48 hours. In certain embodiments, a sealant cures, at room temperature, to a Shore A hardness of 20 A within 24 hours after the time the sealant is no longer workable (end of working time), within 36 hours, and in certain embodiments, within 48 hours.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured compositions of the present disclosure becomes fully developed within 7 days following mixing and application of a curable composition to a surface.

In certain embodiments, sealants provided by the present disclosure can be used to seal surface on aviation and aerospace vehicles. The sealants may be used to seal apertures such as apertures associated with fuel tanks. To seal an aperture a sealant may be applied to a surface or one or more surfaces defining an aperture and the sealant allowed to cure to seal the aperture.

For aerospace sealant applications it can be desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it is desirable that the mixed components have a useful working time or pot life of at least 24 hours and have a tack free cure time at room temperature within 24 hours of the pot life. Useful working time or pot life refers to the time period the composition remains workable for application at ambient temperatures after the catalyst is released.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

In certain embodiments, therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1%±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, cured sealants provided by the present disclosure meet the performance criteria of SAE AS5127/1B, which includes properties such as fuel swell, weight loss, hardness, tensile strength, elongation, peel strength, and lap shear strength. These performance criteria are summarized in Table 14 of the present disclosure.

In certain embodiments, a cured sealant comprising a composition provided by the present disclosure meets or exceeds the requirements for aerospace sealants as set forth in AMS 3277.

Apertures and surfaces, including apertures and surfaces of aerospace vehicles, sealed with compositions provided by the present disclosure are also disclosed.

EXAMPLES

Embodiments provided by the present disclosure are further illustrated by reference to the following examples, which describe compositions and sealants provided by the present disclosure. It will be apparent to those skilled in the art that many modifications, both to materials, and to methods, may be practiced without departing from the scope of the disclosure.

Example 1

Comparative Sealant Formulation

A comparative sealant formulation consisted of two parts, a base and an accelerator. The components for the base formulation are listed in Table 1 and for the accelerator composition in Table 2.

TABLE 1

| Base Composition of Comparative Example 1. | |
|---|---|
| Composition | Weight, g |
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane | 0.2 |
| Tung oil | 1.41 |
| DABCO ® 33-LV | 1.05 |

*Adhesion promoter T-1601; available from PRC-DeSoto International, Inc.
**Permapol ® 3.1E prepolymer; available from PRC-DeSoto International, Inc.

TABLE 2

| Accelerator Composition of Comparative Example 1. | |
|---|---|
| Composition | Weight, g |
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, EPON ® 828 | 50 |

*Adhesion promoter T-1601; available from PRC-DeSoto International, Inc.

The components of the base and the accelerator were separately mixed and the mixture maintained at room temperature for 24 hours before the base and the accelerator are combined.

A sealant was prepared by mixing 100 g of the base with 18.5 g of the accelerator.

The sealant was allowed to cure at room temperature and the status of the cure was monitored periodically and classified as shown in FIG. 1 according to the scale listed in Table 3.

TABLE 3

Curing Status Classification.

| Scale | Curing Status |
|---|---|
| 1 | Freshly mixed sealant |
| 2 | Slightly more viscous than the freshly mixed sealant |
| 3 | Noticeably more viscous than the freshly mixed sealant |
| 4 | Slight gelling, but the sealant is movable and spreadable |
| 5 | Gelled and not spreadable |
| 6 | Slightly more gelled |
| 7 | Almost cured, but not tack-free |
| 8 | Tack-free |
| 9 | Shore A hardness 20A |
| 10 | Shore A hardness 35A |
| 11 | Shore A hardness 45A |

In addition, the tensile strength, elongation, peel strength, lap shear strength, fuel swell, weight loss, and hardness of the cured sealant were measured according to SAE AS5127/1B. The results are shown in Table 14.

Example 2

Sealant Formulation 2

A sealant formulation consisted of two parts, a base and an accelerator. The components of the base formulation are listed in Table 4 and of the accelerator composition in Table 5.

TABLE 4

Base Composition of Example 2.

| Composition | Weight, g |
|---|---|
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane | 0.2 |
| Tung oil | 1.41 |
| Ethyl acetate | 10.63 |
| Technicure ® 101*** | 2.13 |

*Adhesion promoter T-1601; available from PRC-DeSoto International, Inc.
**Permapol ® 3.1E prepolymer; available from PRC-DeSoto International, Inc.
***Available from A&C Catalysts, Inc.

TABLE 5

Accelerator Composition of Example 2.

| Composition | Weight, g |
|---|---|
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, EPON ® 828 | 50 |

*Adhesion promoter T-1601; available from PRC-DeSoto International, Inc.

The base and accelerator compositions were separately prepared and mixed, and the compositions maintained at room temperature for twenty-four (24) hours before combining.

A sealant was prepared by mixing 100 g of the base with 18.5 g of the accelerator.

The sealant was allowed to cure at room temperature and the status of the cure was monitored periodically and classified as shown in FIG. 1 according to the scale listed in Table 3.

In addition, the tensile strength, elongation, peel strength, lap shear strength, fuel swell, weight loss, and hardness of the cured sealant were measured according to SAE AS5127/1B. The results are shown in Table 14.

Example 3

Sealant Formulation 3

A sealant formulation consisted of two parts, a base and an accelerator. The components of the base formulation are listed in Table 6 and of the accelerator composition in Table 7.

TABLE 6

Base Composition of Example 3.

| Composition | Weight, g |
|---|---|
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane | 0.2 |
| Tung oil | 1.41 |
| DABCO ® 33-LV | 1.05 |
| Ethyl acetate | 10.63 |
| Technicure ® LC-80*** | 2.66 |

*Adhesion promoter is available from PRC-DeSoto International, Inc.
**Permapol ® 3.1E prepolymer is available from PRC-DeSoto International, Inc.
***Encapsulated imidazole available from A&C Catalysts, Inc.

TABLE 7

Accelerator Composition of Example 3.

| Composition | Weight, g |
|---|---|
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, EPON ® 828 | 50 |

*Adhesion promoter T-1601, available from PRC-DeSoto International, Inc.

The base and accelerator compositions were separately prepared and mixed, and maintained at room temperature for twenty-four (24) hours before combining.

A sealant was prepared by mixing 100 g of the base with 18.5 g of the accelerator.

The sealant was allowed to cure at room temperature and the status of the cure was monitored periodically and classified as shown in FIG. 1 according to the scale listed in Table 3.

In addition, the tensile strength, elongation, peel strength, lap shear strength, fuel swell, weight loss, and hardness of the cured sealant were measured according to SAE AS5127/1B. The results are shown in Table 14.

Example 4

Sealant Formulation 4

A sealant formulation consisted of two parts, a base and an accelerator. The components for the base formulation are listed in Table 8 and for the accelerator composition in Table 9.

TABLE 8

Base Composition of Example 4.

| Composition | Weight, g |
| --- | --- |
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane | 0.2 |
| Tung oil | 1.41 |
| DABCO 33-LV | 1.05 |
| Ethyl acetate | 10.63 |
| Nissocure ® TIC-188*** | 7.08 |

*Adhesion promoter T-1601, available from PRC-DeSoto International, Inc.
**Permapol ® 3.1E polymer is available from PRC-DeSoto International, Inc.
***Imidazole inclusion catalyst available from Nisso-Soda, Japan.

TABLE 9

Accelerator Composition of Example 4.

| Composition | Weight, g |
| --- | --- |
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, EPON ® 828 | 50 |

*Adhesion promoter T-1601, available from PRC-DeSoto International, Inc.

The base and accelerator compositions were separately prepared and mixed, and the compositions were maintained at room temperature for twenty-four (24) hours before combining.

A sealant was prepared by mixing 100 g of the base with 18.5 g of the accelerator.

The sealant was allowed to cure at room temperature and the status of the cure was monitored periodically and classified as shown in FIG. 1 according to the scale listed in Table 3.

In addition, the tensile strength, elongation, peel strength, lap shear strength, fuel swell, weight loss, and hardness of the cured sealant were measured according to SAE AS5127/1B. The results are shown in Table 14.

Example 5

Sealant Formulation 5

A sealant formulation consisted of two parts, a base and an accelerator. The components for the base formulation are listed in Table 10 and for the accelerator composition in Table 11.

TABLE 10

Base Composition of Example 5.

| Composition | Weight, g |
| --- | --- |
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane | 0.2 |
| Tung oil | 1.41 |
| Encapsulated DBU*** | 1.77 |

*Adhesion promoter T-1601, available from PRC-DeSoto International, Inc.
**Permapol ® 3.1E prepolymer is available from PRC-DeSoto International, Inc.
***Encapsulated DBU is available from Salvona Technologies LLC (New Jersey) as EID-8519-01. DBU is 1,8-diazabicyclo[5.4.0]undec-7-ene.

TABLE 11

Accelerator Composition of Example 5.

| Composition | Weight, g |
| --- | --- |
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, EPON ® 828 | 50 |

*Adhesion promoter T-1601, available from PRC-DeSoto International, Inc.

The base and accelerator compositions were separately prepared and mixed, and the compositions were maintained at room temperature for twenty-four (24) hours before combining.

A sealant was prepared by mixing 100 g of the base with 18.5 g of the accelerator.

The sealant was allowed to cure at room temperature and the status of the cure was monitored periodically and classified as shown in FIG. 1 according to the scale listed in Table 3.

In addition, the tensile strength, elongation, peel strength, lap shear strength, fuel swell, weight loss, and hardness of the cured sealant were measured according to SAE AS5127/1B. The results are shown in Table 14.

Example 6

Sealant Formulation 6

A sealant formulation consisted of two parts, a base and an accelerator. The components for the base formulation are listed in Table 12 and for the accelerator composition in Table 13.

TABLE 12

Base Composition of Example 5.

| Composition | Weight, g |
| --- | --- |
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane | 0.2 |
| Tung oil | 1.41 |
| DABCO 33-LV | 1.05 |

TABLE 12-continued

Base Composition of Example 5.

| Composition | Weight, g |
|---|---|
| Ethyl acetate | 10.63 |
| Nissocure ® TIC-110-A01*** | 7.08 |

*Adhesion promoter T-1601, available from PRC-DeSoto International, Inc.
**Permapol ® 3.1E prepolymer is available from PRC-DeSoto International, Inc.
***Imidazole inclusion catalyst available from Nisso-Soda, Japan.

TABLE 13

Accelerator Composition of Example 5.

| Composition | Weight, g |
|---|---|
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, EPON ® 828 | 50 |

*Adhesion promoter T-1601, available from PRC-DeSoto International, Inc.

The base and accelerator compositions were separately prepared and mixed, and the compositions were maintained at room temperature for twenty-four (24) hours before combining.

A sealant was prepared by mixing 100 g of the base with 18.5 g of the accelerator.

The sealant was allowed to cure at room temperature and the status of the cure was monitored periodically and classified as shown in FIG. 1 according to the scale listed in Table 3.

In addition, the tensile strength, elongation, peel strength, lap shear strength, fuel swell, weight loss, and hardness of the cured sealant were measured according to SAE AS5127/1B. The results are shown in Table 14. The mark "-" means that measurements were not made.

TABLE 14

Results.

| Sealant Property | Comparative Example 1 | Example 2 | Example 3 | Example 4 | Example 5 | Example 6 |
|---|---|---|---|---|---|---|
| Dry Tensile Strength*, psi | 406 | 469 | — | — | — | — |
| Dry Elongation*, % | 278 | 313 | — | — | — | — |
| Dry Hardness*, Shore A | 48 | 45 | 43 | 44 | 46 | 43 |
| Tensile Strength after Fuel Immersion**, psi | 357 | 620 | — | — | — | — |
| Elongation after Fuel Immersion**, % | 282 | 306 | — | — | — | — |
| Hardness after Fuel Immersion**, Shore A | 43 | 40 | — | — | — | — |
| Fuel Swell**, % | 18.2 | 15.6 | 13.9 | 13.5 | 16.6 | 13.0 |
| Weight Loss**, % | 2.6 | 3.4 | 3.07 | 3.03 | 2.92 | 3.02 |
| Dry Lap Shear Strength/% Cohesive on MIL-C-27725 Substrate*, psi/% | 458/100% | 505/100% | — | — | — | — |
| Lap Shear Strength/% Cohesive after Fuel Immersion on MIL-C-27725 Substrate**, psi/% | 365/100% | 378/100% | — | — | — | — |
| Dry Peel Strength/% Cohesive on MIL-C-27725 Substrate*, pli/% | 65/100% | 63/100% | — | — | — | — |
| Peel Strength/% Cohesive after Fuel Immersion on MIL-C-27725 Substrate**, pli/% | 38/100% | 40/100% | — | — | — | — |

*No JRF Type I immersion.
**Immersed in JRF Type I at 140° F. for 7 days.

The results demonstrate that the use of latent tertiary amine catalysts in thiol-epoxy sealant compositions can provide extended working time, cure rapidly at the end of the curing time, and provide a cured sealant that meets the demanding performance requirements of aerospace sealant applications.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising:
    a thiol-terminated polythioether prepolymer;
    an epoxy curing agent; and
    a latent tertiary amine catalyst selected from an encapsulated tertiary amine catalyst, a tertiary amine inclusion catalyst, and a combination thereof.

2. The composition of claim 1, wherein the thiol-terminated polythioether prepolymer comprises a thiol-termi nated polythioether comprising a backbone comprising the structure of Formula (1):

$$—R^1—[—S—(CH_2)_2—O—[—R^2—O—]_m—(CH_2)_2—S—R^1]_n— \quad (1)$$

wherein,
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $—[(—CHR^3—)_p—X—]_q—(CHR^3)_r—$ group, wherein each $R^3$ is selected from hydrogen and methyl;
each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $—[(—CH_2—)_p—X—]_q—(CH_2)_r—$ group;
each X is independently selected from O, S, and —NR—, wherein R is selected from hydrogen and methyl;
m ranges from 0 to 50;
n is an integer ranging from 1 to 60;
p is an integer ranging from 2 to 6;
q is an integer ranging from 1 to 5; and
r is an integer ranging from 2 to 10.

3. The composition of claim 1, wherein the thiol-terminated polythioether comprises a thiol-terminated polythioether of Formula (2a), a thiol-terminated polythioether of Formula (2b), or a combination thereof:

$$HS—R^1—[—S—(CH_2)_2—O—(R^2—O)_m—(CH_2)_2—S—R^1]_n—SH \quad (2a)$$

$$\{HS—R^1—[—S—(CH_2)_2—O—(R^2—O)_m—(CH_2)_2—S—R^1]_n—S—V'—\}_zB \quad (2b)$$

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_p—X—]_q—(—CHR^3—)_r—$,
wherein,
p is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $—[(—CHR^3—)_p—X—]_q—(—CHR^3—)_r—$, wherein p, q, r, $R^3$, and X are as defined as for $R^1$;
m is an integer from 0 to 50;
n is an integer from 1 to 60;
B represents a core of a z-valent, polyfunctionalizing agent $B(—V)_z$ wherein,
z is an integer from 3 to 6; and
each V is a moiety comprising a terminal group reactive with a thiol; and
each —V'— is derived from the reaction of —V with a thiol.

4. The composition of claim 1, wherein the thiol-terminated polythioether comprises the reaction product of reactants comprising:
(a) a dithiol of Formula (3):

$$HS—R^1—SH \quad (3)$$

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $—[—(CHR^3)_p—X—]_q—(CHR^3)_r—$; wherein,
each $R^3$ is independently selected from hydrogen and methyl;
each X is independently selected from —O—, —S—, —NH—, and —NR— wherein R is selected from hydrogen and methyl;
p is an integer from 2 to 6;
q is an integer from 1 to 5; and
r is an integer from 2 to 10; and
(b) a divinyl ether of Formula (4):

$$CH_2=CH—O—[—R^2—O—]_m—CH=CH_2 \quad (4)$$

wherein,
each $R^2$ is independently selected from $C_{1-10}$ alkanediyl, $C_{6-8}$ cycloalkanediyl, $C_{6-14}$ alkanecycloalkanediyl, and $—[(—CHR^3—)_p—X—]_q—(—CHR^3—)_r—$, wherein p, q, r, $R^3$, and X are as defined for $R^1$; and
m is an integer from 0 to 50.

5. The composition of claim 4, wherein the reactants comprise (c) a polyfunctional compound comprising a polyfunctional compound $B(—V)_z$, wherein,
B represents a core of a z-valent, polyfunctionalizing agent $B(—V)_z$ wherein,
z is an integer from 3 to 6; and
each V is a moiety comprising a terminal group reactive with a thiol; and
each —V'— is derived from the reaction of —V with a thiol.

6. The composition of claim 1, wherein the thiol-terminated polythioether prepolymer is characterized by an average thiol functionality from 2.05 to 2.8.

7. The composition of claim 1, wherein the epoxy curing agent is selected from a Novolac epoxy resin, a bisphenol A/epichlorohydrin derived epoxy resin, and a combination thereof.

8. The composition of claim 1, wherein the tertiary amine catalyst comprises an imidazole-epoxy adduct.

9. The composition of claim 1, wherein the tertiary amine catalyst comprises an imidazole.

10. The composition of claim 1, wherein the tertiary amine catalyst comprises 1,8-diazabicyclo[5.4.0]undec-7-ene.

11. The composition of claim 1, formulated as a sealant.

12. The composition of claim 11, characterized by a working time from about 40 hours to about 120 hours at room temperature.

13. The composition of claim 11, which cures tack free within 24 hours to 48 hours at room temperature after the time the composition is no longer workable.

14. The composition of claim 11, which cures to a Shore A hardness of 20 A within 24 hours to 48 hours at room temperature after the time the composition is no longer workable.

15. A cured sealant prepared from the composition of claim 11.

16. A method of sealing one or more surfaces, comprising:
applying the composition of claim 11 to one or more surfaces; and
curing the applied composition to seal the one or more surfaces.

* * * * *